March 29, 1960        P. M. BELLOWS        2,930,394
SELF-LOADING TANK AND CONTROL VALVE THEREFOR
Filed April 1, 1957
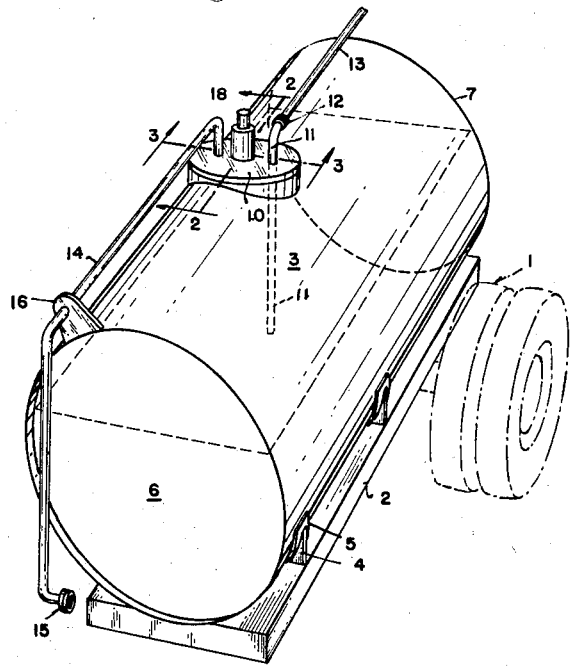
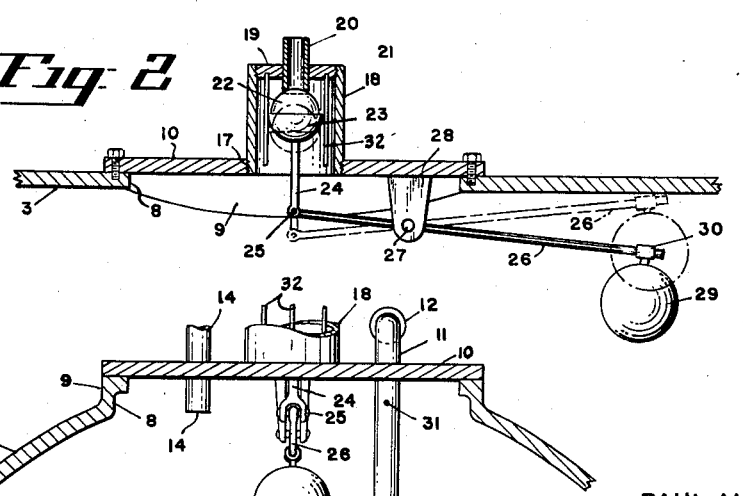
PAUL M. BELLOWS
INVENTOR.
BY *James L. Givnan*
ATT'Y

2,930,394

SELF-LOADING TANK AND CONTROL VALVE THEREFOR

Paul M. Bellows, Ridgefield, Wash.

Application April 1, 1957, Serial No. 650,031

1 Claim. (Cl. 137—205)

This invention relates to a portable tank-fed liquid fertilizer spreader of the type shown and described in my United States Patent No. 2,792,255, issued May 14, 1957, and more particularly to a method and means of loading the tank.

It is one of the principal objects of the invention to provide new and novel means for drawing liquid fertilizer such as liquid manure from a storage tank directly into a sealed, portable distributing tank by use of a vacuum and not through a suction pump as heretofore.

Another object is to provide automatic means for breaking the vacuum within the tank to stop the filling operation when the fluid reaches a predetermined level within the tank, and also additional vacuum-breaking means to function as a safety valve in the event of failure of the first mentioned means to thereby prevent collapse of the tank.

Another object is to provide apparatus of this character which is of simple, efficient, durable, and relatively inexpensive construction and wherein its several parts are readily accessible for adjustment, repair or replacement.

With the foregoing and other advantages in view, it will become apparent as the description proceeds that the invention consists essentialy in the novel combination and arrangement of parts hereinafter described in detail and illustrated in the accompanying drawing, in which:

Figure 1 is a perspective view of a liquid fertilizer spreader tank equipped with my invention.

Figures 2 and 3 are sectional views on an enlarged scale and taken respectively along the lines 2—2 and 3—3 of Figure 1.

Referring now more particularly to the drawing:

In Figure 1 reference numeral 1 indicates the supporting wheels for any approved type of trailer vehicle frame indicated at 2. Mounted upon and within the frame is a tank 3 secured in place by means of vertical plates 4 welded or otherwise secured at their bottom ends to the members of the frame 2 and provided at their top ends with cradle plates 5 secured to the tank. The tank is sealed at both of its ends by end plates 6 and 7 and may be provided on its interior with one or more baffle plates (not shown) which serve to reinforce the tank against collapse under the influence of vacuum applied to its interior. The top portion of the tank is provided with a filler opening 8 surrounded by a vertical upwardly extending annular flange 9 to which is bolted a circular closure plate 10 in the conventional manner. Secured to the closure 10 is a standpipe 11 whose one end extends downwardly through the closure into open communication with the interior of the tank 3 near the bottom thereof and whose opposite end is connected as at 12 by a suitable coupling with an intake pipe or hose 13 of sufficient length to terminate within a storage tank (not shown) for drawing the contents thereof by suction into the tank 3. Also secured to and extending downwardly through the closure plate 10 and in open communication with the interior of the tank 3 is one end of a suction pipe 14 whose opposite end is adapted by a suitable fitting 15 to be coupled to a source of suction such as, for example, a suction pump (not shown) which could be conveniently mounted on the trailer frame 2. The pipe is also secured to the tank 3 by a bracket 16.

Threadedly secured as at 17 to the center of the closure 10 and open to the interior of the tank 3 is a vertically disposed cylindrical valve housing 18 closed at its top end by a removable closure plate 19 through which extends an air intake pipe 20 provided at its bottom end with a valve seat 21. Cooperating with the valve seat is a ball valve 22 mounted within a cup 23 from which depends an actuating stem 24. The bottom end of the stem is pivotally connected as at 25 to one end of an actuating lever arm 26 fulcrumed as at 27 at the bottom end of a bracket 28 secured to and extending downwardly from the tank closure plate 10. The opposite or free end of the lever arm is provided with a float 29 adjustably attached to the lever arm by means of a friction sleeve 30.

From the foregoing it will be apparent that suction created within the pipe 14, tank 3, and intake pipe 13 will draw fluid into the tank from a storage tank (not shown) or other source of fluid supply. When the fluid within the tank reaches the float 29 the float will be caused to rise and through the medium of the lever arm 26 pull the ball valve 22 downwardly away from its seat 21 at the bottom end of the air intake pipe 20, thus breaking the vacuum by venting the interior of the tank to the atmosphere and thereby prevent further filling of the tank. Any residual suction within the intake pipe 13 is rendered ineffective by an aperture 31 provided therein and always above any fluid level predetermined by the setting of the float 29 relative to the actuating lever arm 26. Secured to the closed end 19 of the housing 18 and extending downwardly to the interior thereof are a plurality of guide pins 32 surrounding the ball cup 23 to stabilize it in operation and to insure proper seating of the ball valve 22 against the seat 21.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

A sealed tank having a filler opening and a removably secured closure plate therefor, said closure plate having a top and bottom surface, a fluid intake pipe secured to said closure plate in communication at one of its ends with the interior of the tank and terminating near the bottom of the tank, the other end of said intake pipe being connected to one end of a fluid intake hose whose opposite end is adapted for placement in a fluid storage tank, a suction pipe secured to the closure plate with one of its ends in communication with the interior of the sealed tank and its opposite end adapted for connection to a source of suction, a vertically disposed cylindrical housing secured to the top surface of the closure plate and closed at its top end by a removable closure plate and open at its bottom end to the interior of the sealed tank, an air intake pipe extending vertically through said removable closure plate and provided with a valve seat at its bottom end, a pressure seated ball valve cooperating with said valve seat, a cup supporting said ball valve, a vertically depending stem secured at its top end to said cup and connected at its bottom end to one end of a lever arm disposed on the interior of the sealed tank and pivotally attached near one of its ends to the bottom surface of said closure plate, a plurality of vertically depending pins secured to and depending from said removable closure plate of said cylindrical housing and concentrically surrounding said cup to provide guidance for the ball valve toward and away from said valve seat, a float attached to the opposite end of said lever arm whereby said valve will be held against its seat by the weight of the float acting on the lever arm in the absence of fluid to seal said air intake pipe whereby fluid from said storage tank will be drawn into the sealed tank by suction in said fluid intake hose and intake pipe and whereby reverse action of the lever arm by the buoyancy of the float at a predetermined fluid level will unseat the ball valve and thereby break the suction within the sealed tank by admitting atmospheric pressure, and whereby the ball valve will be guided in its return to the valve seat by said cup-surrounding pins upon gravitation of the float-weighted end of said lever in the absence of fluid.

References Cited in the file of this patent

UNITED STATES PATENTS

| | | |
|---|---|---|
| 1,044,311 | Wall | Nov. 12, 1912 |
| 1,793,159 | Costa et al. | Feb. 17, 1931 |
| 2,225,844 | Pye | Dec. 24, 1940 |
| 2,285,581 | Horton | June 9, 1942 |

FOREIGN PATENTS

| | | |
|---|---|---|
| 1,084,743 | France | July 13, 1954 |